No. 814,612. PATENTED MAR. 6, 1906.
J. H. LUBBERS.
METHOD OF MAKING GLASS SHEETS.
APPLICATION FILED DEC. 10, 1897.

5 SHEETS—SHEET 1.

No. 814,612. PATENTED MAR. 6, 1906.
J. H. LUBBERS.
METHOD OF MAKING GLASS SHEETS.
APPLICATION FILED DEC. 10, 1897.

5 SHEETS—SHEET 2.

WITNESSES
INVENTOR
John H. Lubbers
by Bakewell & Bakewell
his Attorneys.

No. 814,612. PATENTED MAR. 6, 1906.
J. H. LUBBERS.
METHOD OF MAKING GLASS SHEETS.
APPLICATION FILED DEC. 10, 1897.
5 SHEETS—SHEET 3.
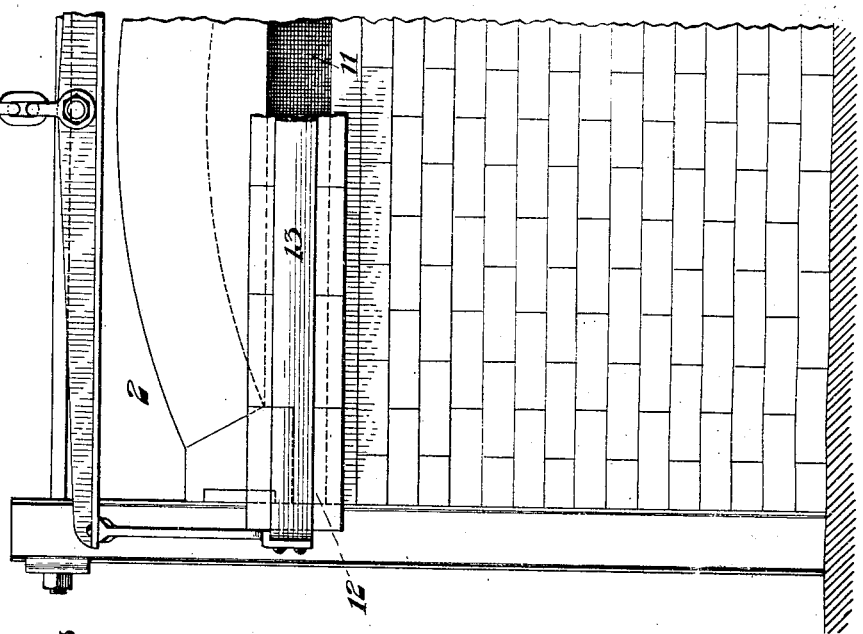
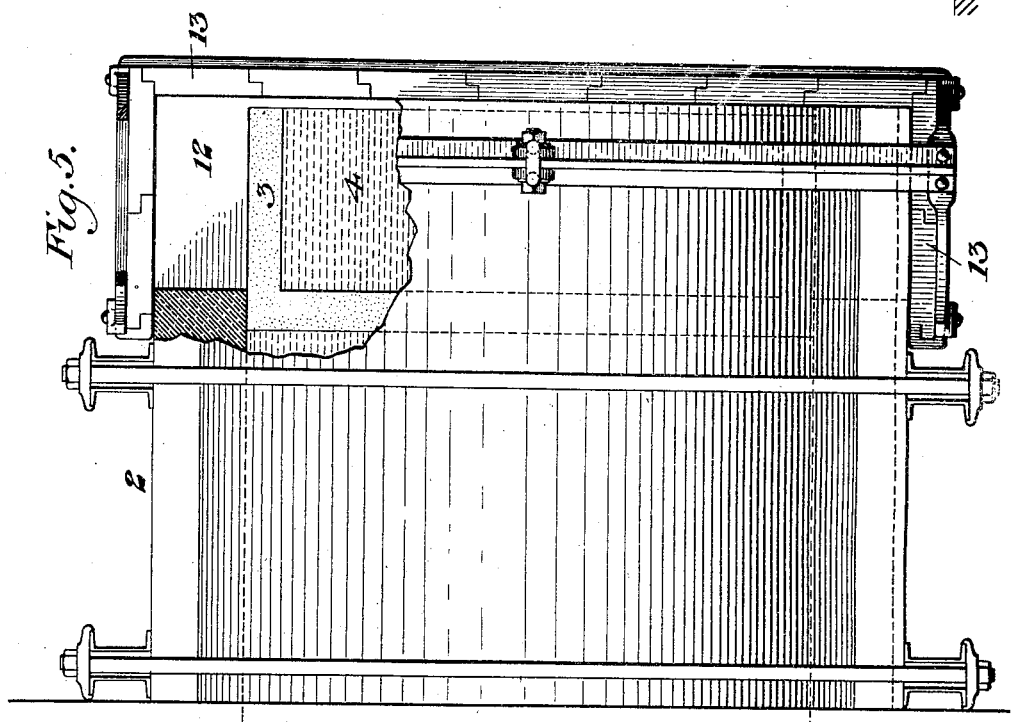

No. 814,612. PATENTED MAR. 6, 1906.
J. H. LUBBERS.
METHOD OF MAKING GLASS SHEETS.
APPLICATION FILED DEC. 10, 1897.
5 SHEETS—SHEET 4.
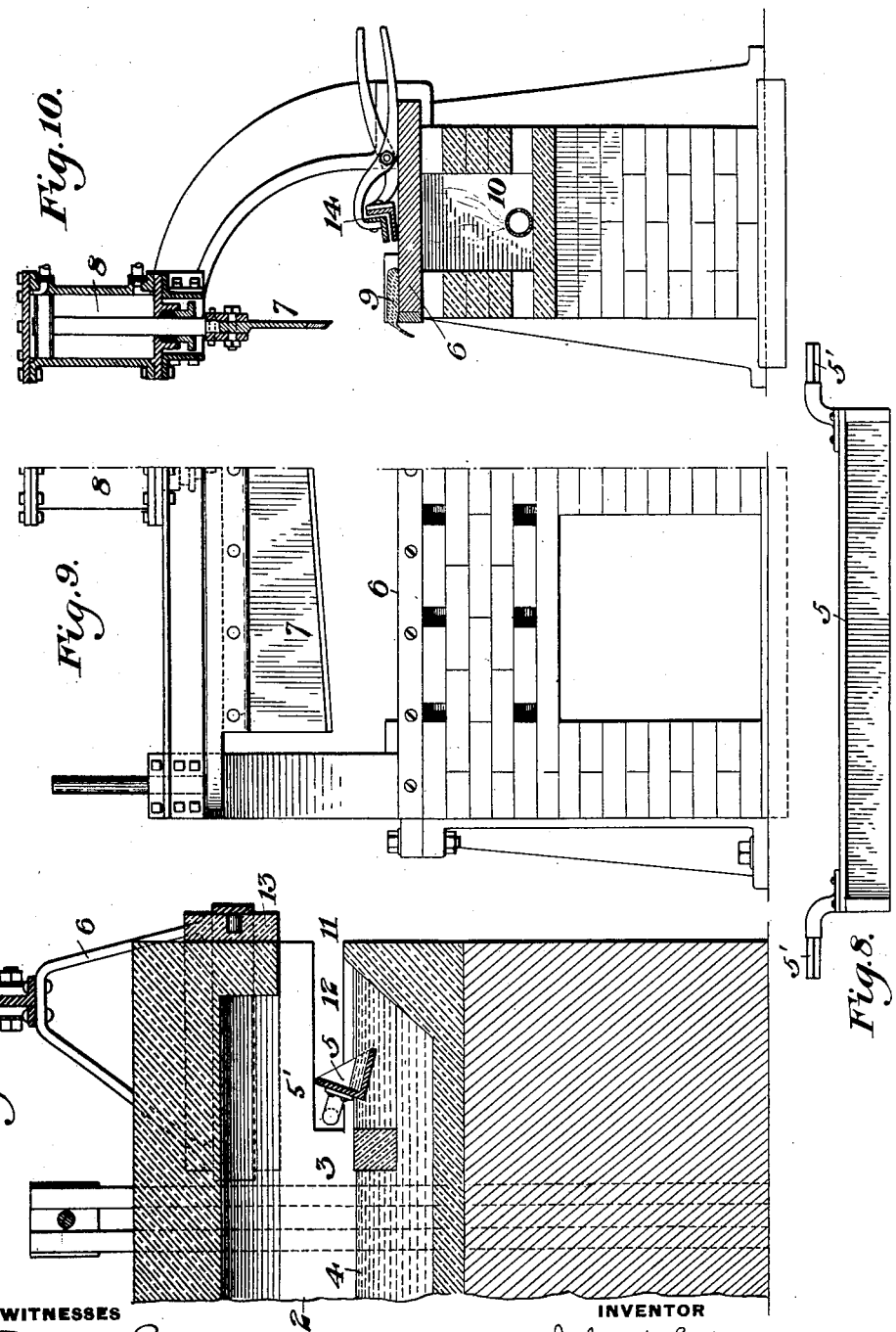
WITNESSES
INVENTOR No. 814,612. PATENTED MAR. 6, 1906.
J. H. LUBBERS.
METHOD OF MAKING GLASS SHEETS.
APPLICATION FILED DEC. 10, 1897.

5 SHEETS—SHEET 5.

WITNESSES
INVENTOR
John H. Lubbers
by Bakewell & Bakewell
his Attorneys.

UNITED STATES PATENT OFFICE.

JOHN H. LUBBERS, OF NEW KENSINGTON, PENNSYLVANIA.

METHOD OF MAKING GLASS SHEETS.

No. 814,612.

Specification of Letters Patent.

Patented March 6, 1906.

Application filed December 10, 1897. Serial No. 661,373.

*To all whom it may concern:*

Be it known that I, JOHN H. LUBBERS, of New Kensington, in the county of Westmoreland and State of Pennsylvania, have invented a new and useful Improvement in Methods of Making Glass Sheets, of which the following is a full, clear, and exact description, reference being had to accompanying drawings, forming part of this specification, in which—

Figure 1:
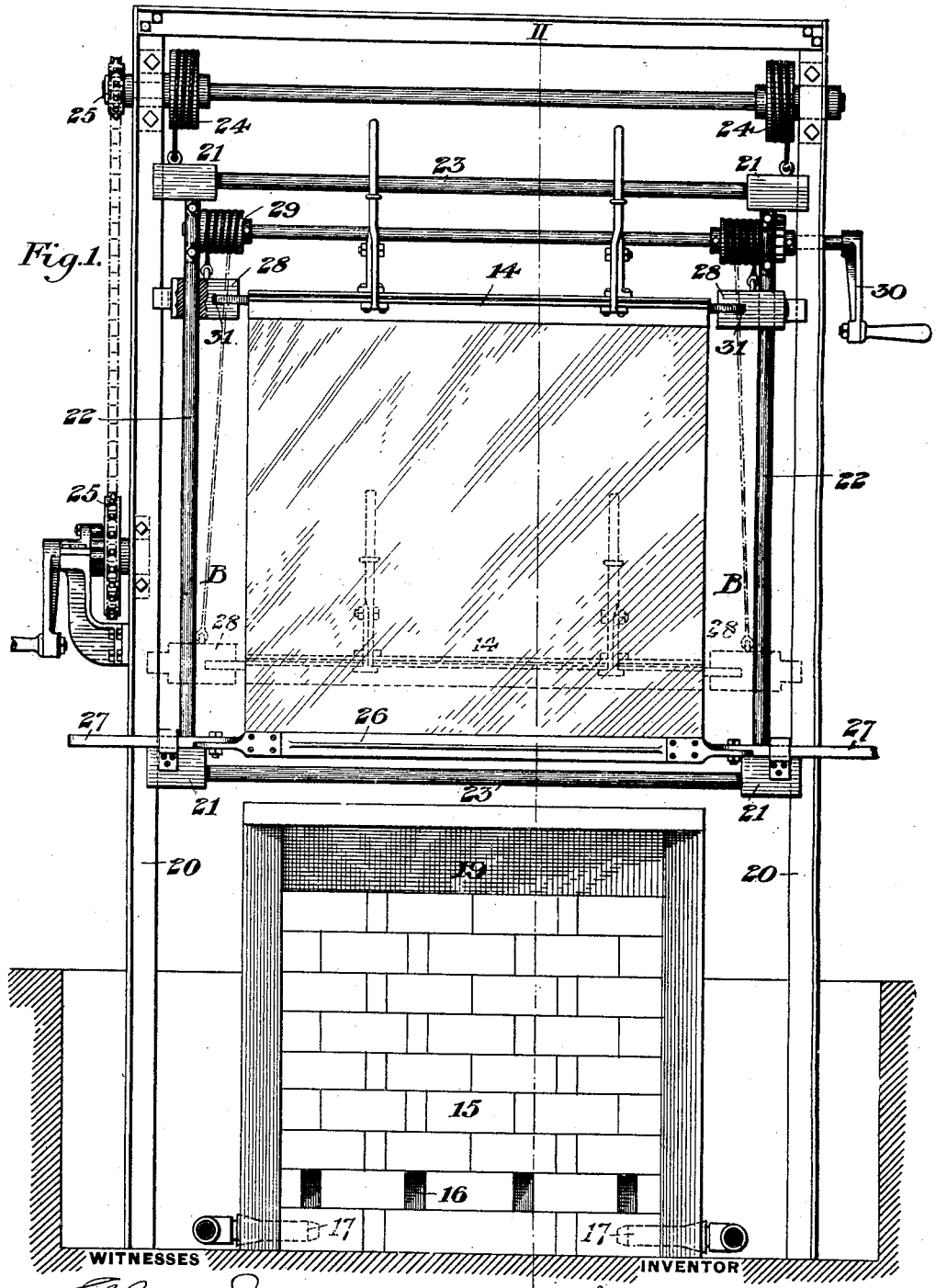
Figure 2:
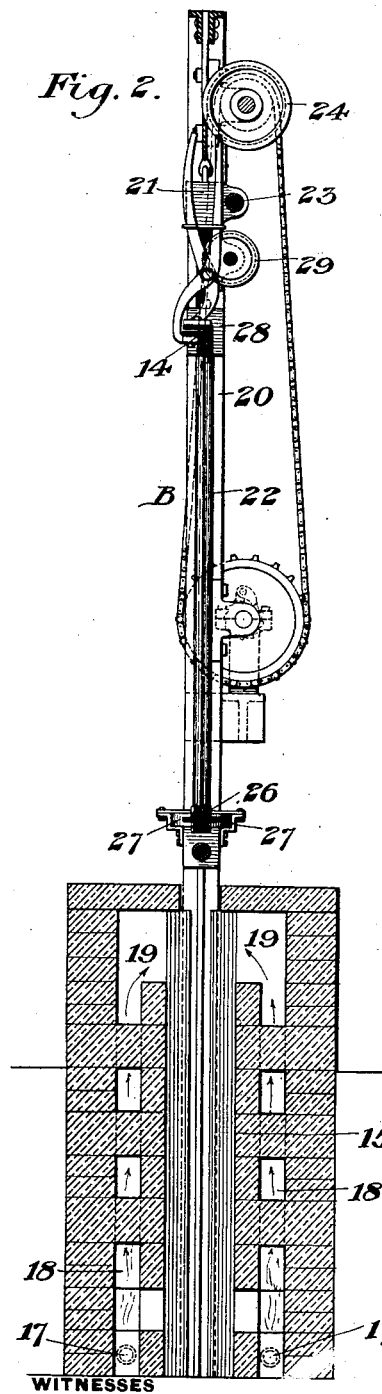
Figure 3:
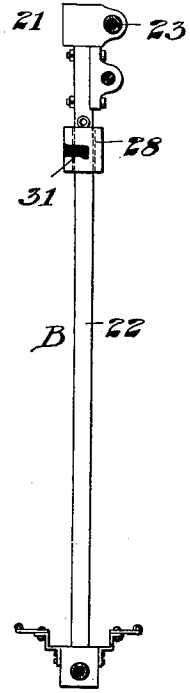
Figure 4:
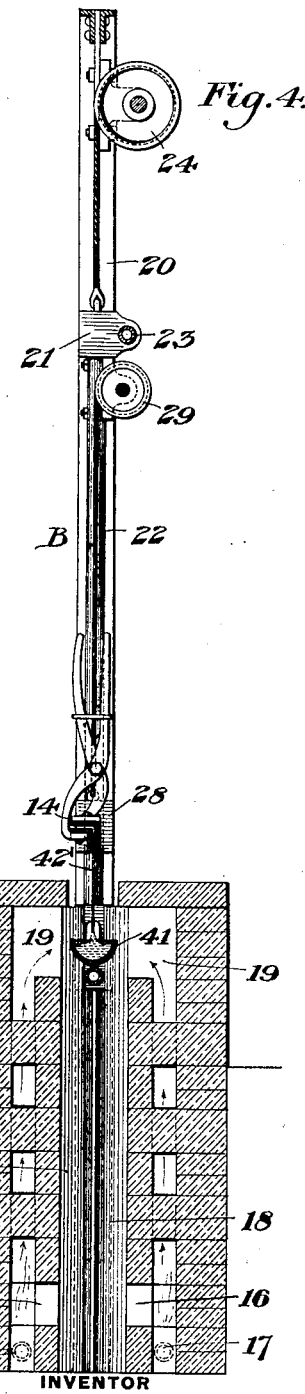
Figure 11:
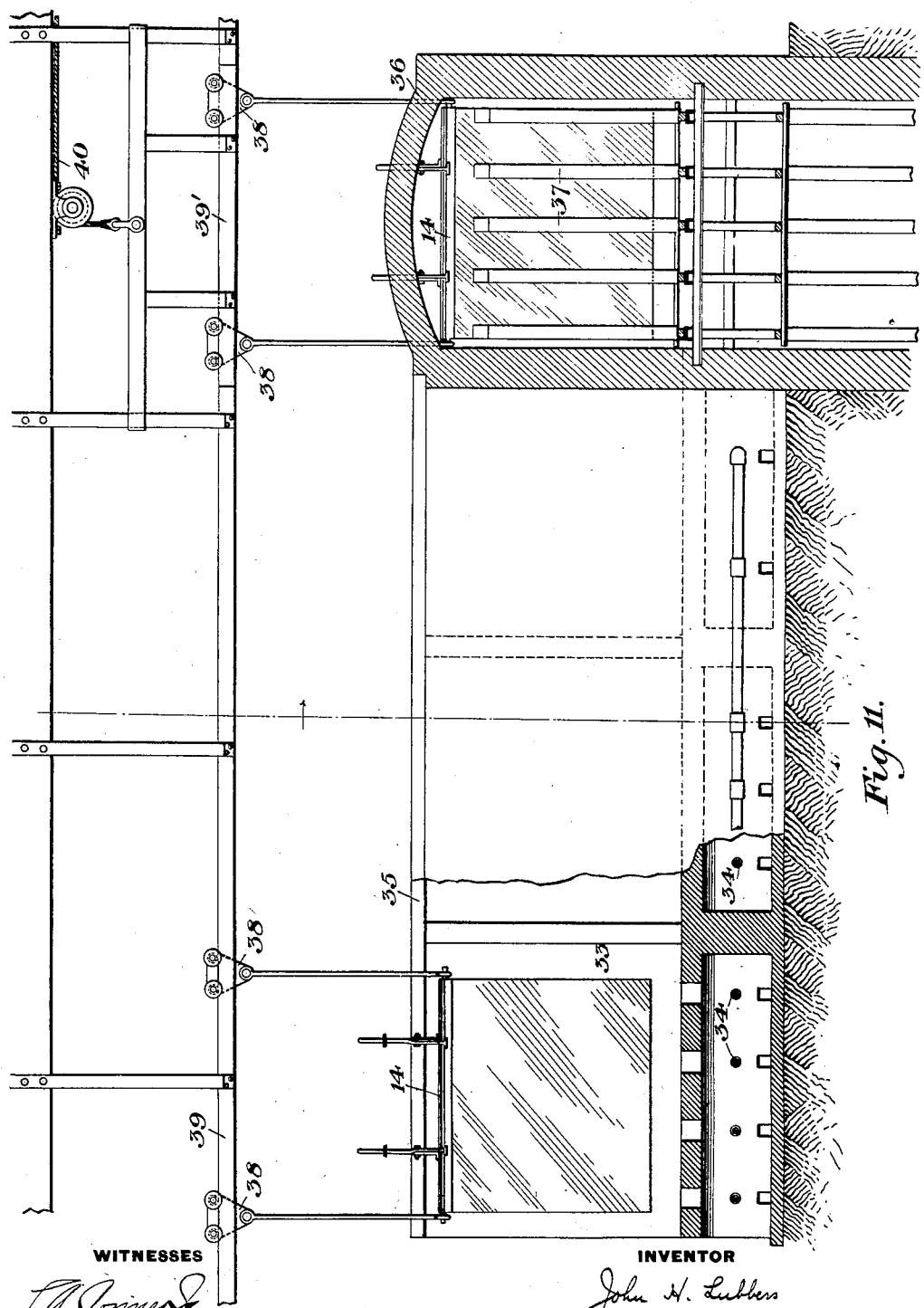

Figure 1 shows in front elevation glass-stretching apparatus constructed in accordance with my invention, the furnace being shown in vertical central section. Fig. 2 is a vertical section on the line II II of Fig. 1. Fig. 3 is a detail view of the drawing mechanism. Fig. 4 is a view similar to Fig. 2, but illustrating a modification of my invention. Fig. 5 is a top plan view of a glass-melting furnace, showing the means which I prefer to employ for forming the glass slab. Fig. 6 is a front elevation of the same. Fig. 7 is a vertical section of Fig. 5. Fig. 8 is a view of the ladle. Fig. 9 is a front elevation of the shears which I employ for cutting off the edge of the glass slab. Fig. 10 is a vertical section of Fig. 9. Fig. 11 is a longitudinal sectional view showing a leer in which glass sheets made in accordance with my invention may be annealed.

My invention relates to a new method of making glass sheets and comprises a method wherein a glass slab is formed and then with suitable application of heat is stretched and elongated into the form of a sheet.

Referring to Figs. 5, 6, and 7 of the drawings, 2 represents a glass-melting tank which is provided with a float or floating bridge 3, separating a pool of molten glass 4 at the front of the tank from the body of glass in the rear and keeping back from it the floating impurities.

For the purpose of forming a slab of glass, which is the preliminary step in my method of manufacture, I employ an elongated ladle or scoop 5, which is placed within the tank in the body of glass 4, and end portions or trunnions 5' thereof extend out through slots 12 in the side walls of the furnace, so that they may be engaged by a tool in the hands of the workman.

In forming the slab the operator inserts the scoop into the furnace, as shown in Fig. 7, and draws it forwardly, thus scooping up molten glass from the tank. He then carries the scoop to the table 6 of shears 7, which are actuated by a vertical cylinder and plunger 8, and by upturning the scoop the glass is deposited on the table in the form of a slab 9, at the edge of which is a ragged portion or film formed when the scoop leaves the body of molten glass in the tank. Then by operation of the shears the edge of the slab with the ragged adherent film of glass is sheared off. The table 6 of the shears is heated by a gas-burner or other source of heat 10 situated beneath it.

Immediately after the scoop has been lifted from the furnace the door-opening 11 at the front of the furnace and the slots 12 at the side thereof may be closed by lowering a door or doors 13 over these openings.

After the slab has been sheared off, as above explained, it is grasped by tongs 14, Fig. 10, the jaws of which are of the length of the slab and are preferably faced with asbestos or other non-heat-conducting material. The slab is then carried by the tongs to the drawing apparatus (illustrated in Figs. 1 to 3, inclusive,) which comprises mechanism for stretching the glass slab and a furnace for heating it.

The furnace consists of a vertical chamber 15, at the base of which are ports 16, adapted to admit heat from burners 17 or other suitable source of heat placed in chambers 18, which extend upwardly in the wall of the furnace parallel with the middle chamber 15 and at their upper ends 19 discharge into said middle chamber. The middle chamber is therefore heated at its base, but its point of greatest heat is at its upper end.

The glass-stretching mechanism comprises vertical guideways 20, between which is mounted a frame B, comprising upper and lower blocks 21, connected by upright bars 22 and cross-bars 23. The frame B is adapted to move vertically within the guideways, into or out of the furnace-chamber 15, and it is actuated in such sliding motion by drums 24 and gearing 25 or by other suitable mechanism. At the lower end of the frame B are tongs 26, adapted to be operated by handles 27 and to grasp the lower edge of the glass slab, and in said frame also there are sliding blocks 28, which can be moved vertically by drums 29 and a crank 30 or other suitable mechanism and which are adapted to receive and hold in sockets 31 the ends of the tongs 14, by which the glass slab is carried from the shear-table.

The operation is as follows: The tongs 14, carrying the glass slab, are brought to the drawing apparatus, and the tongs are set in the blocks 28, as shown in Fig. 1, the blocks 28 being then in the position shown in dotted lines in said figure. The lower edge of the slab is also grasped by the tongs 26, and if the slab needs to be heated in order to render it sufficiently plastic to undergo the stretching operation the frame B is lowered, so as to bring the slab into the upper part of the chamber 15, where it is subjected to heat. When the glass is sufficiently plastic for the purpose, the operator by turning the crank 30 will raise the blocks 28 and tongs 14, thus drawing the tongs 14 away from the lower tongs and stretching the glass slab which is held between them. By reason of such stretching the slab is elongated gradually into the form of a sheet, and as it is elongated the operator can judge by his eye whether the glass is at the proper temperature for stretching and can regulate its temperature by lowering or raising the frame B into or out of the vertical chamber 15 of the furnace. The temperature of the glass slab and its degree of plasticity are therefore under ready control. When finally the blocks 28 have been drawn as far as desired and the glass slab reduced to the form of a sheet, it is ready to be taken to an annealing oven or leer. To take the sheet to the leer, I have devised a conveying mechanism (shown in Fig. 11) consisting of a tunnel 33, heated by burners 34 from below and having in its roof a vertical slot 35. This chamber terminates at its inner end in the transverse tunnel 36 of a leer having glass-conveying mechanism 37 therein, adapted to carry the glass sheets through the leer in vertical positions, as described in my prior patent, No. 555,047, dated February 18, 1896. After the glass sheet has been formed in the apparatus shown in Fig. 1 the tongs 26 are closed upon its lower edge and the tongs 14, still carrying the glass sheet, are detached from the blocks 28 and are suspended from a carrier 38, running on an overhead track 39. The hangers of the carriers 38 are adapted to travel in the slot 35 and carry the glass sheet in a suspended position through the chamber 33. As they travel through said chamber the glass sheets are subjected to heat; but being suspended in a vertical position they are not apt to be distorted. When the glass sheets reach the end of the chamber 33, they are carried forward into the tunnel of the leer 36, and a section 39' of the overhead track 39, which is directly above the tunnel 36, is made vertically movable by means of a hoisting apparatus 40 or otherwise, so that when the glass is in the tunnel it can be lowered vertically upon the carrying-arms 37 of the leer mechanism. When the sheet is deposited upon said arms, the tongs 14 may be released therefrom, the track-section 39 raised, and the tongs drawn forwardly away from the leer.

In Fig. 4 I show the furnace and drawing mechanism used for drawing of a glass sheet, not from a slab, but from a body of molten glass contained in a ladle supported within the furnace-chamber. This ladle 41 is suspended on a lower cross-bar of the frame B, and its length is coextensive with the width of the frame. The ladle charged with molten glass is lowered with the frame, so as to bring it into the chamber 15 and to preserve it in heated condition. The tongs 14, to which a piece 42' of an already-formed glass sheet is attached, are then lowered by moving down the blocks 28, so as to bring the lower edge of the glass sheet 42' into contact with the molten glass in the ladle. The tongs are then raised slowly, and as they rise the adhesion of the molten glass in the ladle to the piece of glass sheet causes the glass to be drawn from the ladle in the form of a sheet the thickness of which is determined by the degree of plasticity of the molten glass and by the speed at which the tongs are moved. The temperature of the glass as drawn and of the body of glass can easily be regulated by raising or lowering the ladle within the furnace.

Those skilled in the art will understand that my improved apparatus may be varied in many respects without departure from the principles of my invention as stated in the following claims.

The advantages of my invention will be appreciated by those skilled in the art. It affords a cheap and ready way of making glass sheets and of dispensing with the expensive mode heretofore in common use of blowing cylinders and rollers and then opening and flattening them.

I claim—

1. The method of making sheet-glass, consisting in drawing and elongating a slab of heated glass in its own plane by applying a pulling force to one end of the slab; substantially as described.

2. The method of making sheet-glass, consisting in drawing and elongating a glass slab in its own plane and upwardly by applying a pulling force to one end of the sheet, and heating it during the elongating; substantially as described.

3. The method herein described which consists in scooping out a body of glass from a furnace and depositing the same in the form of a slab and then stretching it in the plane of the slab; substantially as described.

4. The method herein described which consists in scooping out a body of glass from a furnace, depositing the same in the form of a slab and shearing the ragged edge of said slab; substantially as described.

5. The method herein described which consists in scooping out a body of glass from a furnace, depositing the same in the form of a slab, shearing the ragged edge of the slab, and stretching the sheared slab into the form of a sheet; substantially as described.

6. The method of making sheet-glass, consisting in forming a glass slab or plate of plastic glass, and elongating the same by drawing it upwardly in a vertical direction; substantially as described.

7. The method of making sheet-glass, consisting in pulling upwardly in a vertical direction on a plate of plastic heated glass, and then carrying the sheet of stretched glass horizontally through an annealing-chamber; substantially as described.

In testimony whereof I have hereunto set my hand.

JOHN H. LUBBERS.

Witnesses:
F. E. GAITHER,
G. B. BLEMMING.